US008375363B2

(12) United States Patent
Zhou et al.

(10) Patent No.: US 8,375,363 B2
(45) Date of Patent: *Feb. 12, 2013

(54) MECHANISM TO CHANGE FIRMWARE IN A HIGH AVAILABILITY SINGLE PROCESSOR SYSTEM

(75) Inventors: Bill J. Zhou, Milpitas, CA (US); Richard L. Hammons, Hollister, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1601 days.

This patent is subject to a terminal disclaimer.

(21) Appl. No.: 11/769,771

(22) Filed: Jun. 28, 2007

(65) Prior Publication Data
US 2008/0215915 A1  Sep. 4, 2008

Related U.S. Application Data

(63) Continuation of application No. 10/282,948, filed on Oct. 29, 2002, now Pat. No. 7,284,236.

(51) Int. Cl.
*G06F 9/44* (2006.01)
*G06F 9/445* (2006.01)
*G06F 11/00* (2006.01)

(52) U.S. Cl. ........ 717/121; 717/120; 717/168; 717/178; 714/23

(58) Field of Classification Search .......... 717/120–121, 717/168, 178; 714/23
See application file for complete search history.

(56) References Cited

U.S. PATENT DOCUMENTS

| | | | | |
|---|---|---|---|---|
| 5,649,089 A | * | 7/1997 | Kilner | 714/6.3 |
| 5,933,449 A | * | 8/1999 | Meyer | 375/219 |
| 5,953,314 A | * | 9/1999 | Ganmukhi et al. | 370/220 |
| 5,978,933 A | * | 11/1999 | Wyld et al. | 714/13 |
| 6,094,689 A | | 7/2000 | Embry et al. | |
| 6,108,300 A | * | 8/2000 | Coile et al. | 370/217 |
| 6,226,261 B1 | * | 5/2001 | Hurtta et al. | 370/219 |
| 6,240,470 B1 | * | 5/2001 | Murayama et al. | 710/48 |
| 6,282,673 B1 | | 8/2001 | Liu et al. | |
| 6,359,858 B1 | * | 3/2002 | Smith et al. | 370/217 |
| 6,389,019 B1 | * | 5/2002 | Fan et al. | 370/395.42 |
| 6,421,792 B1 | * | 7/2002 | Cromer et al. | 714/36 |
| 6,442,067 B1 | * | 8/2002 | Chawla et al. | 365/185.11 |
| 6,463,584 B1 | * | 10/2002 | Gard et al. | 717/171 |
| 6,487,591 B1 | * | 11/2002 | Budhraja et al. | 709/223 |
| 6,675,258 B1 | * | 1/2004 | Bramhall et al. | 711/114 |
| 6,681,282 B1 | | 1/2004 | Golden et al. | |
| 6,915,445 B2 | * | 7/2005 | Navar et al. | 714/4.12 |
| 6,978,452 B2 | * | 12/2005 | Oesterreicher et al. | 717/171 |
| 7,024,450 B1 | | 4/2006 | Deo et al. | |
| 7,065,673 B2 | * | 6/2006 | Subramaniam et al. | 714/13 |
| 7,076,689 B2 | * | 7/2006 | Atkinson | 714/11 |

(Continued)

OTHER PUBLICATIONS

T. Brey et al., "BladeCenter chassis management", Nov. 2005, IBM J. Res. & Dev. vol. 49 No. 6, retrieved from <citeseerx.ist.psu.edu/viewdoc/download?doi=10.1.1.87...rep...> total pp. 21.*

*Primary Examiner* — Don Wong
*Assistant Examiner* — Marina Lee
(74) *Attorney, Agent, or Firm* — Conley Rose, P.C.

(57) ABSTRACT

A "high availability" system comprises multiple switches under the control of a control processor ("CP"). The firmware executing on the processor can be changed when desired. Consistent with the high availability nature of the system (i.e., minimal down time), a single CP system implements a firmware change by loading new firmware onto the system, saving state information pertaining to the old firmware, preventing the old firmware from communicating with the switches, bringing the new firmware to an active state and applying the saved state information to the new firmware.

39 Claims, 8 Drawing Sheets

U.S. PATENT DOCUMENTS

| | | | |
|---|---|---|---|
| 7,188,237 B2 * | 3/2007 | Zhou et al. | 713/2 |
| 7,194,652 B2 * | 3/2007 | Zhou et al. | 714/4.4 |
| 7,284,236 B2 * | 10/2007 | Zhou et al. | 717/121 |
| 7,590,760 B1 * | 9/2009 | Banks et al. | 709/248 |
| RE42,685 E * | 9/2011 | Oesterreicher et al. | 717/171 |
| 2003/0055919 A1 | 3/2003 | Fong et al. | |
| 2003/0117949 A1 * | 6/2003 | Moller et al. | 370/219 |
| 2004/0083358 A1 * | 4/2004 | Zhou et al. | 713/100 |
| 2004/0083402 A1 * | 4/2004 | Atkinson | 714/11 |
| 2004/0083404 A1 * | 4/2004 | Subramaniam et al. | 714/13 |
| 2004/0083476 A1 * | 4/2004 | Zhou et al. | 718/102 |
| 2004/0100969 A1 * | 5/2004 | Sankar et al. | 370/395.31 |
| 2004/0153624 A1 * | 8/2004 | Zhou et al. | 712/4 |
| 2005/0114846 A1 * | 5/2005 | Banks et al. | 717/136 |
| 2008/0215915 A1 * | 9/2008 | Zhou et al. | 714/15 |
| 2009/0279549 A1 * | 11/2009 | Ramanathan et al. | 370/395.4 |
| 2012/0023309 A1 * | 1/2012 | Abraham et al. | 712/30 |

* cited by examiner

MECHANISM TO CHANGE FIRMWARE IN A HIGH AVAILABILITY SINGLE PROCESSOR SYSTEM

CROSS-REFERENCE TO RELATED APPLICATIONS

The present application is a continuation of, and thus claims priority to, Ser. No. 10/282,948, filed Oct. 29, 2002 by Zhou and Hammons, and entitled, "A Mechanism to Change Firmware in a High Availability Single Processor System," incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to high availability computer networks. More particularly, the invention relates to changing firmware in a high availability, single processor system.

2. Background Information

Initially, computers were most typically used in a standalone manner. It is now commonplace for computers and other types of computer-related and electronic devices to communicate with each other over a network. The ability for computers to communicate with one another has lead to the creation of networks ranging from small networks comprising two or three computers to vast networks comprising hundreds or even thousands of computers. Networks can be set up to provide a wide assortment of capabilities. For example, networks of computers may permit each computer to share a centralized mass storage device or printer. Further, networks enable electronic mail and numerous other types of services. Generally, a network's infrastructure comprises switches, routers, hubs and the like to coordinate the effective and efficient transfer of data and commands from one point on the network to another.

Networks often comprise a "fabric" of interconnected switches which are devices that route data packets from source ports to destination ports. The switches in a network typically are relatively complex devices that include microprocessors, memory, and related components and execute firmware stored in non-volatile memory such as read only memory ("ROM"). The switches typically have multiple ports which may be physically connected to other switches or other devices such as servers, storage devices, user consoles, and other types of I/O devices.

Switches may be fabricated in "blade" form comprising a circuit board mated to a tray. The blade assembly then can be slid into a chassis so that blind mating connectors on the blade engage corresponding sockets in the chassis. In one type of switch chassis embodiment, the chassis is able to accommodate multiple, generally identical, blades (e.g., eight). The number of blades used in the system can be scaled up or down as needed. One or more control processors ("CPs") may also be included in the chassis in blade form. Each CP preferably includes one or more microprocessors, memory (both volatile and non-volatile), and connects to the various switches in the chassis, firmware stored in non-volatile memory which is executed by the CP's microprocessor, etc.

In those systems in which two CPs are provided in a single chassis, typically, one CP is deemed the "active" CP and the other CP is in a "standby" mode of operation. The active CP is fully operational and interactive with the various switches in the chassis, and switches and CPs in other chassis. The standby CP is generally identical to the active CP (i.e., same hardware and same software loaded thereon), but is non-operational. If the active CP fails or otherwise ceases to be fully operational for whatever reason, control may pass from the failed active CP to the standby CP. This fail-over process involves the coordination of a great deal of software state and hardware configuration information and, accordingly, consumes a significant amount of time. As such, it would be highly desirable to reduce the time required as much as possible to fail over from the active CP to the standby CP. It is also desirable to minimize the disruption of service that may occur during the fail-over process.

BRIEF SUMMARY OF THE PREFERRED EMBODIMENTS OF THE INVENTION

The preferred embodiments of the present invention solve the problems noted above by a "high availability" system which comprises one or more switches (or other electronic devices) under the control of one or more control processors ("CPs"). One of the CPs is deemed to be the "active" CP, while the other CP is kept in a "standby" mode. Each CP generally has the same software load including a fabric state synchronization ("FSS") facility. The FSSs of each CP communicate with each other.

In accordance with a preferred embodiment of the invention, the state information pertaining to the active "image" (i.e., the software service running on the active CP) is continuously provided to a standby copy of the image (the "standby image"). The FSSs perform the function of synchronizing the standby image to the active image. The state information generally includes configuration and operational dynamically changing parameters and other information regarding the active image. By keeping the standby image synchronized to the active image, the standby image can rapidly be transitioned to the active mode if the active image experiences a fault. Armed with the state of the previous active image, the standby image will continue operating where the previous active image left off. Some state updates may not be provided to the standby image before the active image fails. The software on the standby CP accounts for this situation, and performs a consistency check when it takes over to determine whether some updates may have been missed.

The fail-over process involves multiple stages of processing of various executable components of the image. Some stages may depend on the prior execution of other stages. In accordance with another aspect of the invention, once it is determined that a fail-over to the standby image is needed, the standby image pulls control away from the failed active image. The preferred fail-over process includes the use of a staging table which permits the standby image's FSS facility to efficiently schedule the various stages of the fail-over process taking into account the inter-stage dependencies noted above.

In accordance with another preferred embodiment of the invention, a standby CP which becomes the active CP, re-issues all messages that the previously active CP had issued and which have not yet completed. Each transaction of messages through the network is assigned a transaction identifier ("XID") that uniquely distinguishes that transaction from other transactions. In accordance with a preferred embodiment, the newly active CP uses a different range of XIDs than its predecessor CP. By using a different range of XID values, the newly active CP can determine whether an incoming response message is responsive to a message that originated from the previously active CP or the newly activated CP. The currently active CP preferably ignores all response messages that do not have an XID in the CP's XID range. This ensures proper and reliable messaging in the network during a fail-over event.

In accordance with yet another embodiment of the invention, changing a CP's firmware may be desired to provide, for example, additional functionality. It further may be desired to change firmware in a single CP system. Consistent with the high availability nature of the present system (i.e., minimal down time), a single CP system implements a firmware change by loading a reboot manager utility and registering the utility as a standby image with the FSS. Then, the currently active image is prompted to save its state to a file stored in non-volatile memory. Upon an optional reboot of the CP, the new firmware is brought up as a standby image; the reboot manager is launched as an active image. A state restore then occurs in which the previously saved state is provided to the standby image. Then, a fail-over is forced to transition the standby image (which contains the new firmware) to the active mode. During the state save operation, the firmware preferably does not distinguish between communicating with its standby counterpart and communicating with the reboot manager. Likewise, during the state restore phase, the firmware generally has no knowledge that it is receiving the updates from the reboot manager, instead of receiving from the active counterpart.

These and other aspects and benefits of the preferred embodiments of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect physical connection. Thus, if a first device couples to a second device, that connection may be through a direct physical connection, or through an indirect physical connection via other devices and connections. The term "state" or "state information" refers to values, variables, and other entities that are used for software and/or hardware to run. State information typically dynamically varies during run time and usually is more than just configuration information.

To the extent that any term is not specially defined in this specification, the intent is that the term is to be given its plain and ordinary meaning.

DETAILED DESCRIPTION OF THE PREFERRED EMBODIMENTS

Figure 1:
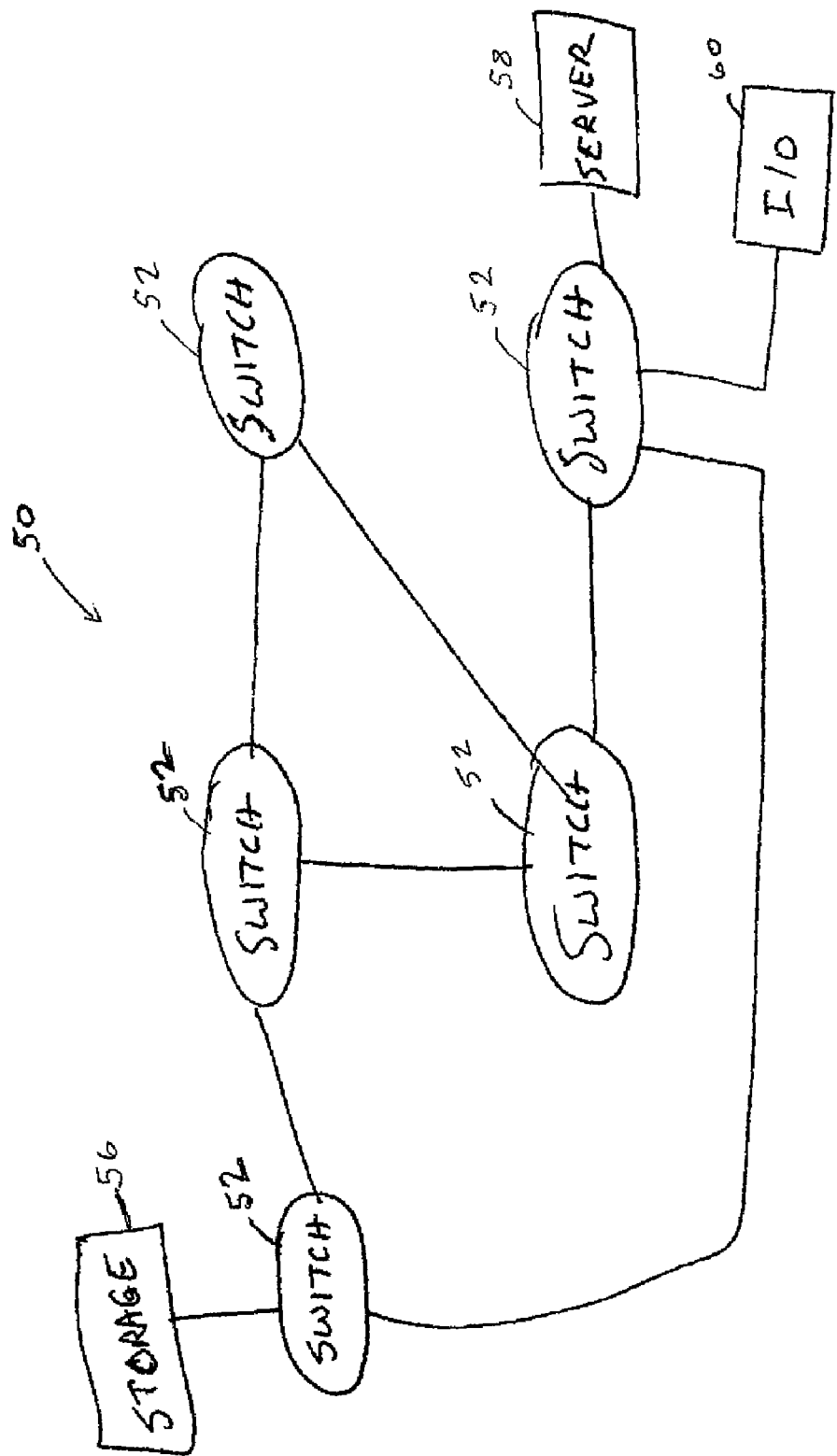
FIG. 1 shows an exemplary switch fabric comprising a plurality of switches and end node devices.

Referring now to FIG. 1, a network 50 is shown in accordance with a preferred embodiment of the invention. As shown, the network 50 comprises a plurality of inter-connected switches 52. One or more end nodes are also attached to various of the switches 52 and can communicate with each other via the fabric of switches. The end nodes may include one or more storage devices 56, one or more server computers 58, input/output ("I/O") devices 60 (e.g., a console), and other desired devices. Messages from one end node to another are routed through the fabric of switches 52 in a manner determined by routing tables that are loaded into each switch. The network 50 may be implemented in accordance with the Fibre Channel standard, or other suitable type of well-known or custom-designed network.

Figure 2:
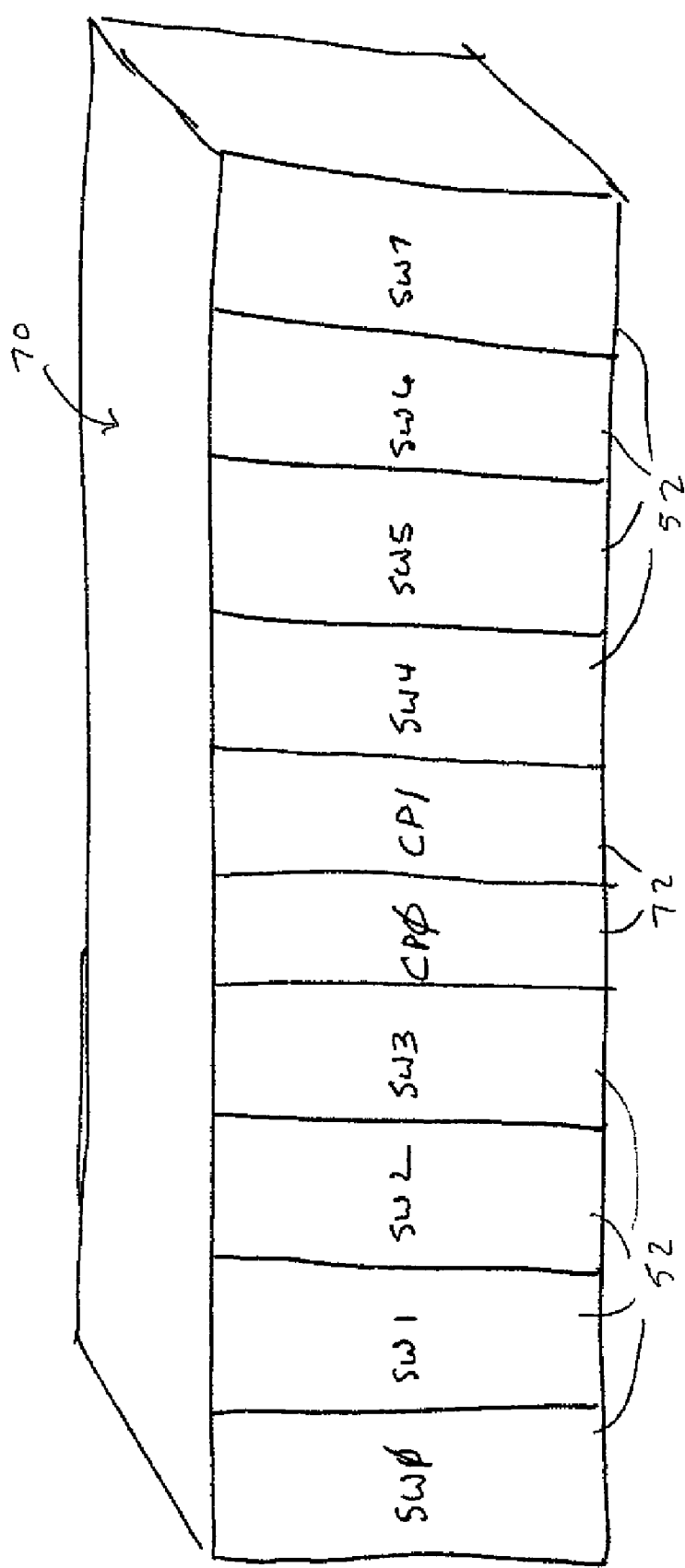
FIG. 2 shows a chassis in which a plurality of switches and control processors are mounted.

FIG. 2 shows one exemplary embodiment of a chassis 70 containing a plurality of switches 52. The chassis 70 shown in FIG. 2 includes the capacity to accommodate eight switches 52 which are labeled SW0-SW7. The chassis 70 preferably also accommodates one or more control processors ("CPs") 72. Two CPs 72 are shown in FIG. 2 and are labeled as CP0 and CP1. In general, the CPs 72 control the operation of the switches 52. Although the system can operate with only one CP, two are preferred for redundancy. Although the preferred embodiment is described herein in the context of network switches, it should be understood that CPs can be used in conjunction with many other types of electronic devices.

Figure 3:
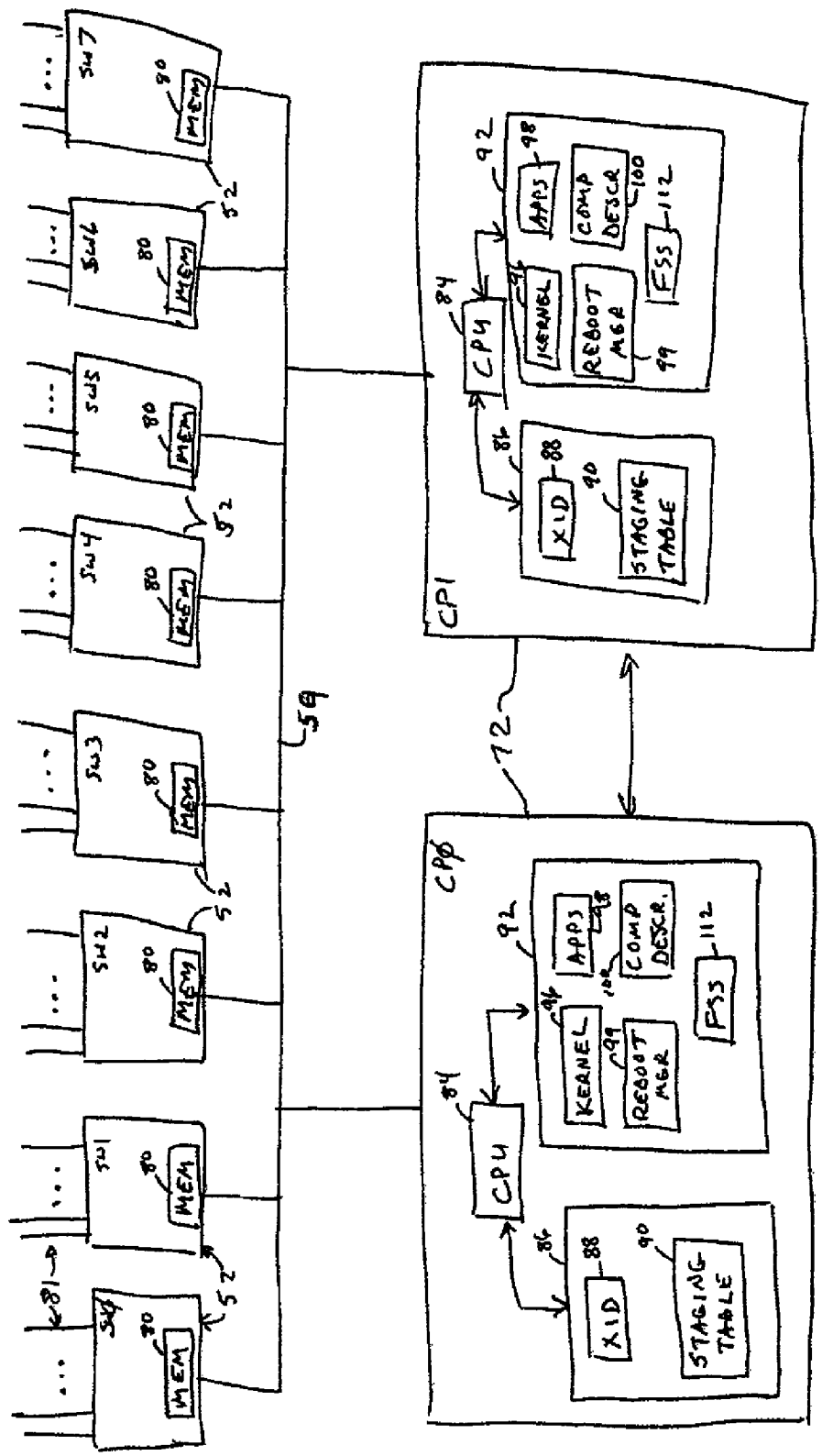
FIG. 3 shows a block diagram of the switches and control processors of FIG. 2 in accordance with a preferred embodiment of the invention.

As shown in FIG. 3 the CPs 72 couple to each of the switches 52 via one or more busses 59. Each switch 52 can connect to other switches in the chassis 70, to switches in other chassis, and to end nodes via a plurality of ports 81. Each node on the switch can be configured to send and/or receive messages. The connection 59 between the switches 52 and the CPs 72 may be a bus separate from the ports 81 or one of the ports 81 on each switch may be used to connect the switch to the CPs. Alternatively, each CP can connect to a group of switches SW0-SW3 via one bus and another group of switches SW4-SW7 via a different bus. The CPs 72 perform numerous management functions with regard to the switches 52. An example of such a management function is to load a routing table into the memory 80 of each switch. The routing table specifies how a switch is to route incoming messages received on an input port 81 to an output port 81. Thus, the routing table takes into account the fabric topology the system architect has established for the network. FIG. 1 represents one exemplary topology of how end nodes and switches can be connected together and thus the routing tables would reflect that topology. The CPs 72 generally configure each of the switches 52. Once configured, the switches generally run autonomously meaning CPs 72 are not needed simply for a switch to route messages between input and output ports. The CPs 72, however, may perform other management functions as keeping statistics, static or dynamic route changes, naming or addressing configuration changes and processing network control messages.

Referring again to FIG. 3, each CP 72 preferably includes a central processing unit ("CPU") 84, volatile memory 86 and non-volatile memory 92. Volatile memory 86 may comprise random access memory ("RAM"). Non-volatile memory 86 may comprise flash memory, a hard disk drive, or other types of non-volatile memory. The non-volatile memory 92 includes various routines and files that are executed and used by CPU 84. Those routines may include a fabric state synchronization ("FSS") facility 112, operating system kernel 96, application software 98, a reboot manager 99, and a component description file 100. The volatile memory 86 is used to temporarily store data in accordance with known techniques. The volatile memory 86 may contain an exchange identifier ("XID") table 88 and a staging table 90 as will be described below.

In accordance with a preferred embodiment of the invention, the system of switches 52 and CPs 72 is implemented with "high availability" features. High availability generally refers to the system's capability to quickly recover from a fault with little, or no, down-time. Various aspects of the high availability nature of the system will be described below.

Fabric State Synchronization ("FSS")

Referring still to FIG. 3, in accordance with a preferred embodiment of the invention, two CPs 72 are provided to control the associated switches 52. Preferably, only one CP 72 is needed to control the switches, the other CP being used for redundancy purposes. Thus, if the currently active CP fails, control can pass to the backup CP (referred to herein as being in a "standby" mode). More than one standby CP can be provided if desired. If a fail-over to the standby CP is required (for example, due to a failure of the active CP), the fail-over preferably occurs as quickly as possible so as to minimize the amount of down time. To that end, state information associated with the active CP is provided periodically to the standby CP thereby synchronizing the standby CP to the active CP. By keeping the standby CP synchronized to the active CP during run-time, the standby CP's transition to the active state is expedited.

Figure 4:
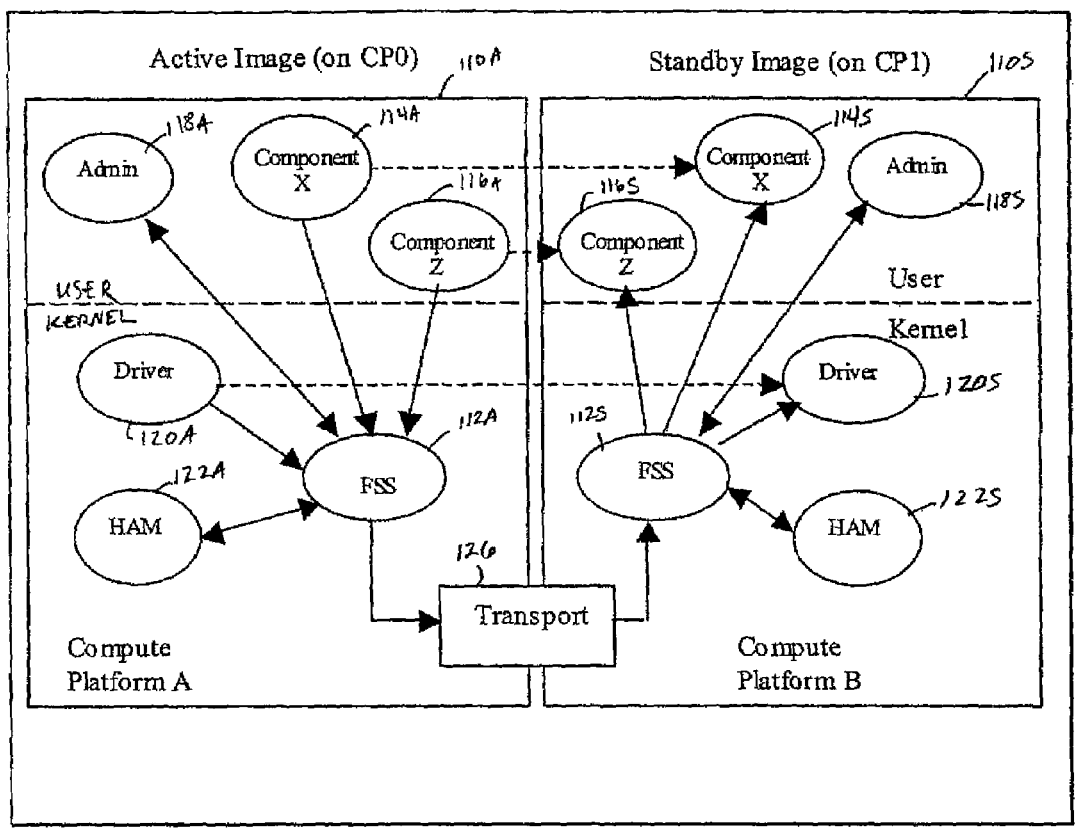
FIG. 4 shows a preferred embodiment illustrating the synchronization interaction between a pair of control processors.

Various terminology relevant to the synchronization and failover processes will now be introduced. This terminology should not be used to limit the scope of this disclosure, but is merely being provided for sake of ease in understanding the principles discussed herein. Reference is now made to FIG. 4 which shows two images—an active image 110A and a standby 110S. The "A" designation refers to "active" and the "S" designation refers to "standby." Each image includes an FSS facility 112A, 112S and executable routines in both user space and operating system kernel space. For example, two components 114A/S and 116A/S are shown in the user space along with an administrator component 118A, 118S. Other components may be included as well. The kernel space includes one or more drivers 120A, 120S and a high availability manager ("HAM") 122A, 122S. A transport 126 comprises a communication link between the active FSS 112A and the standby FSS 112S.

A focus of the high availability nature of the present system is to provide fault resilient instances of "services." A service generally refers to a collection of related software that performs a predetermined function. In this context, for example, the software supporting a switch 52 could be considered a service, as would a storage virtualization facility running on a virtualization co-processor blade. A service may comprise one or more service "components." The components are generally executable routines. A switch service, for example, may contain various individual components, including application level components and one or more kernel level components such as switch and network drivers.

Each component typically has "state" information associated with it. The state information may include configuration and operational values of the software and hardware associated with the component. The state of the service generally comprises the aggregate of the states of the various components comprising the service.

A service "instance" generally refers to a single, fully-specified, configuration of a service. An instance comprises the state of the set of user-level applications and associated kernel state that represent a unique instance of the service. There may be multiple instances of a specific service type running on a given CP 72. For example, two switch service instances may run on a single CP. Multiple types of services may also run on a single computing platform. An example of this is a Fibre Channel-to-iSCSI bridge service instance supporting an iSCSI-Fibre Channel Bridge blade in the same chassis with four switch services supporting other Fibre Channel switches in the same chassis.

In accordance with a preferred embodiment of the invention, multiple "copies" (also called "images") of a single service instance may also be included. Each of these images is placed into one of two modes: Active or Standby. At any single point in time, only one image of a service instance is active. The active image is fully operational and is what the external logic sees as "the service." Zero or more images of the service instance may be in the standby mode. A standby image preferably runs on a different CP than the CP on which the active image runs. If desired, however, a standby image may run on the same CP as its active image counterpart. Further, more than one standby image can be included as desired.

A service instance is identified by a service instance identifier, which may be an alphanumeric name or other type of identifier. All images (active and standby) of a specific service instance preferably have the same name. Different instances instantiated on a given computing platform have unique names. Active and standby images preferably occupy separate namespaces, thereby allowing an active image and a standby image of a service instance to exist on the same CP at the same time. Service instance names are the basis for connections between images. That is, a standby image of service instance XYZ will connect to the active image of service instance XYZ. Service instance names can take whatever form is desired by the system architect. For example, the names may comprise two parts: a service name (an ASCII string) and the instance name (another ASCII string) separated by a period ('.').

As noted above, a service "component" is an entity that performs some subset of the actions of a service and maintains some set of state relating to its function. A component may be a user-level process (i.e., an application), a set of state in a multi-threaded application, a kernel thread, or a related set of state information maintained by a kernel component (e.g., by device drivers). In accordance with the preferred embodiment of the invention, a service component is the basic element involved in state synchronization. The FSS 112 facilities route state synchronization messages from a component in an active image to its peer component (i.e., the component with the same name) in the corresponding standby image(s).

A service component preferably is identified by the name of the service instance of which it is a member and by a service component identifier, which also may be an alphanumeric name or other identifier. A service component name preferably comprises an arbitrary ASCII string. The only constraint on the contents of a component name is that it be unique within the service—that is, no two components should have the same component name within a given service.

Referring still to FIG. 4, HAM 122 preferably is responsible for deciding where (i.e., on which CP) active and standby service instance images are to be launched. Before launching the service instance images, the HAM 122 preferably initializes the FSS facilities 112 on the CP 72 with the specifics of the service instances to be run on the CP. The HAM 122 performs this action by creating a service which identifies the service name and the names of all of the components comprising the service. The HAM 122 then calls FSS 112 to create a service instance image identity for each service instance image (active or standby) to be run on the CP. This request preferably includes the name of the service instance, the initial mode of the image (either active or standby) and, if the mode is standby, the network address identifier for the FSS service where the active image is to be run. Creating the service instance image is a configuration operation—it preferably does not cause processes to be launched or kernel state to be created (other than within the FSS driver itself).

In accordance with the preferred embodiment of the invention, all images initialize to the standby mode. Then, one of the images is selected to transition to the active mode. The other image(s) remain(s) in the standby mode.

Once the service is created, it is the responsibility of the FSS supporting a standby image (such as FSS 112S in FIG. 4) to connect to the FSS supporting the active image. The active image listens for a connection request from the standby image. When the HAM 122 creates a standby service instance image that references a separate CP, the FSS 112S preferably establishes a connection to the image on the remote CP. If the remote CP does not answer, the FSS periodically will retry to establish a connection to the image on the remote active CP. The establishment of this inter-FSS connection occurs when the FSS is configured and is independent of whether the actual service instance image has been launched.

A service instance image is considered to be initiated when its various constituent components and relevant kernel context are active. Referring still to FIG. 4, when a service instance is initiated, each component within the service "registers" with FSS 112. As part of the registration process, the components identify themselves by service instance name and component name. This registration establishes a messaging channel with FSS that allows control messages to be sent from FSS to the component and for state synchronization messages to flow from the active components and to the standby components. When all components of a service instance image have registered with FSS, the image is considered "complete," as noted above. The HAM 122 on each image is notified when both the active and standby images are complete. The HAM 122 for the standby image 110S image preferably then initiates a synchronization process by which the active image's component state information is provided to the standby image. In accordance with the preferred embodiment, synchronization is performed between pairs of active/standby components. The dashed lines between components in FIG. 4 indicate this synchronization process. By obtaining the active image's state, the standby image can quickly become the active image and pick up where the previous active image left off in the event a fail-over is needed.

The HAM 122 on the standby image initiates state synchronization by sending a SYNC_START message to FSS 112S specifying the instance name. This message is forwarded to the FSS 112A of the active image and all components of the active image consequently are sent a SYNC_START message. Upon receiving a SYNC_START message, an active component (e.g., 114A, 116A) preferably provides ("updates or "sends") its current state in one or more state update messages it sends to its standby component counterpart. The first of such messages is marked SYNC_BEGIN indicating to the receiving standby component that this and subsequent messages comprise a "sync dump." The standby component (e.g., 114S, 116S) generally responds to reception of a sync dump by replacing its current view of the state of its active counterpart with the new state being provided to it by its counterpart component. The last message in the sync dump sequence is marked with SYNC_END. All intermediate messages in the sequence represent changes in state and are applied incrementally to the standby component image state. These intermediate messages may be to add state information to the standby component, delete state information or modify state information, although typically the update messages within a sync dump will simply add new information. Preferably, the active component will dump its state "atomically" by sending the entire dump sequence without allowing any changes to its state to occur between the sending of the SYNC_BEGIN and the SYNC_END messages. Preferably, the FSS service on the standby CP will store in its own buffer all messages in a dump sequence until the final SYNC_END message is received, at which time all of the messages will be delivered to the standby peer component. When the message marked SYNC_END is successfully delivered to the standby component, that component is marked as "synchronized." As noted above, when all components within an image are synchronized, the state of the image is considered to be "synchronized" as well. It should be noted that the synchronized state is generally meaningful only to the standby image because it is to that image that a fail-over would occur. However, the state may be reported to the HAM 122A on the active side as well.

Once the images are brought up and the active and standby images are synchronized, the system operates in accordance with its normal, run-time functionality. During the course of operation, the state associated with each component may change. Another function performed by the FSS facilities 112 during normal run-time is to provide updated state from the components in the active image to the corresponding components in the standby image. As such, when an active component experiences a change in state, a state update message is sent to the corresponding standby component. As noted above, the change in state may include new information, a change to existing information, or the deletion of old information. The new information may include processing status information, for example noting of the reception of an external request for name server information followed by notice that the request had been fulfilled. In some cases, it will be advantageous for the active component to know that an update has been reliably sent to the standby CP before taking further action related to the information in that update. Such an update is termed a "synchronous" update. Preferably the active component may either "block" (stop further processing) until an acknowledgment for a particular synchronous update has been received, or delay further processing related to individual synchronous updates, in which case the active component will be sent an acknowledgment notification message for each such synchronous update. As explained previously, by keeping the standby components fully apprised of the continuing changes in the state of the active component, the standby image will be ready to fail-over at a moment's notice with little, if any, disruption in services.

Some state updates may not be provided to the standby image before the active image fails. The software on the standby CP accounts for this situation, and performs a consistency check when it takes over to determine whether some updates may have been missed.

Efficient Staged Failover

An active image may fail, thereby ceasing to be fully operational. When an active image has failed, control transitions to the standby image. This process is called a "fail-over." In general, the system may be designed to cause a fail-over as a result of numerous types of failures. However, fail-overs preferably occur upon the occurrence of a non-recoverable active CP/image failure. Because of the nature of the fault experienced by the active image, the active image may be unable to initiate the passing of control to the standby image. Instead, and in accordance with the preferred embodiment, the standby image takes control from the active image. Accordingly, the HAM 122 on the standby image includes a mechanism to detect a failure in the active image. In a preferred embodiment of the invention, a multiplicity of failure detection mechanisms will be used to ensure timely failover. One mechanism unique to the FSS facilities is a TAKE_OVER message sent by the active CP to the standby CP when the FSS facility itself is aware of a failure requiring failover. Other such mechanisms may include support in the hardware of the CPs to indicate one or more failure conditions on the active CP, and a "heartbeat" protocol using messages sent between the CPs at a regular interval to detect whether the other CP is still functioning normally. One skilled in the art may easily adapt any of a multiplicity of well-known detection mechanisms to the purpose of initiating the fail-over function.

Referring to FIGS. 3 and 4, when the HAM 122S on the standby image 110S detects, or is notified of, a failure of the active image, the HAM 122S sends a TAKE_CONTROL message to the standby image. In response, the FSS 112S also sends a GIVE_UP_CONTROL message to the active image in case the active image is sufficiently functional to receive and correctly interpret such a message. The standby FSS 112S also changes its image's mode to "active" and sends all of the standby components a TAKE_CONTROL message. Each standby component then takes whatever action is required for it to become the active component using the state of its previous active counterpart component as its starting point. This permits the standby component to become the active component and resume where the previous active component left off.

When a fail-over has occurred, the service instance that is now active runs without a standby image (unless the system included more than one standby image). Without a standby image, the now active image is vulnerable to a service outage in the event of another failure. However, a new standby image can be created, if desired, on the CP 72 that ran the previously active image that failed. Also, the CP 72 with the failed image can be replaced and a standby image created on the newly installed CP.

Figure 5:
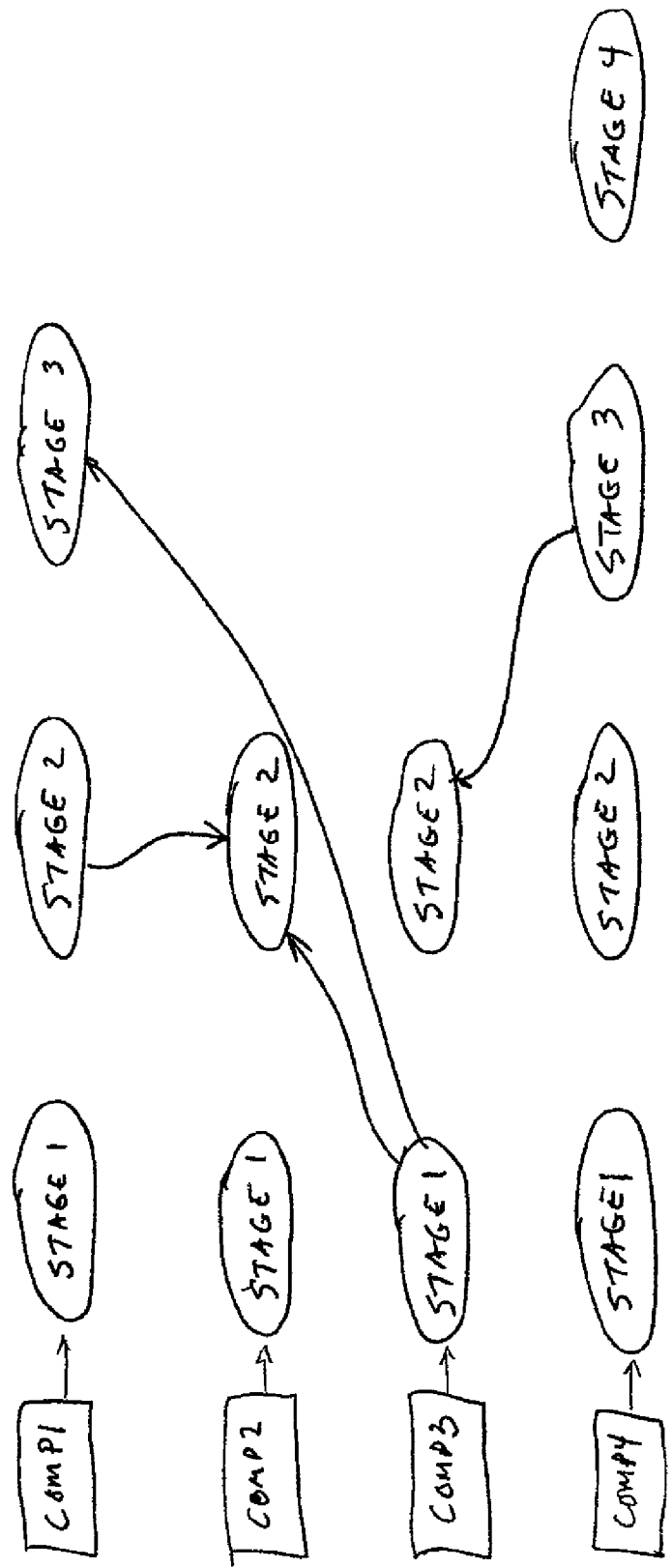
FIG. 5 illustrates a recovery process in which various software components are recovered in stages and some stages of which may depend on other stages.

The following describes more detail regarding the fail-over process. All components originally are brought up to a standby mode as explained above. When a component is requested to become active, the component transitions through a "recovery" process which may include several stages of processing. Referring now to FIG. 5, four exemplary components are shown with their associated stages. Component 1 includes three stages. Components 2 and 3 include two stages each and component 4 includes four stages. The stages associated with each component are performed in order (stage 1, then stage 2, then stage 3, etc.). Some of the stages, however, depend on stages associated with other components. For example, stage 2 of component 1 depends on component 2's stage 2. This means that stage 2 of component 1 should not run until stage 2 of component 2 completes. Similarly, stage 1 of component 3 depends on both stage 2 of component 2 and stage 3 of component 1 meaning that both component 2's stage 2 and component 1's stage 3 should complete before component 3's stage 1 is permitted to start. Also, stage 3 of component 4 depends on stage 2 of component 3.

The preferred embodiment of the invention includes an efficient mechanism to ensure the dependencies between stages in the recovery process. To that end, a staging table is used. The staging table preferably is created and stored in each CP's volatile memory 86 as shown in FIG. 3 (staging table 90). The following describes how the staging table 90 is created and used.

The staging table 90 is generated by the CP 72 during compile-time of the software that runs on the CP. The information used to generate the staging table includes component identifiers, stage identifiers and dependency information. The dependency information may include the identifier (e.g., name) of the stages on which the stage depends. Such information may be stored in a text file on the CP's non-volatile memory 92. Such a file is shown in FIG. 3 as component description file 100.

Figure 6:
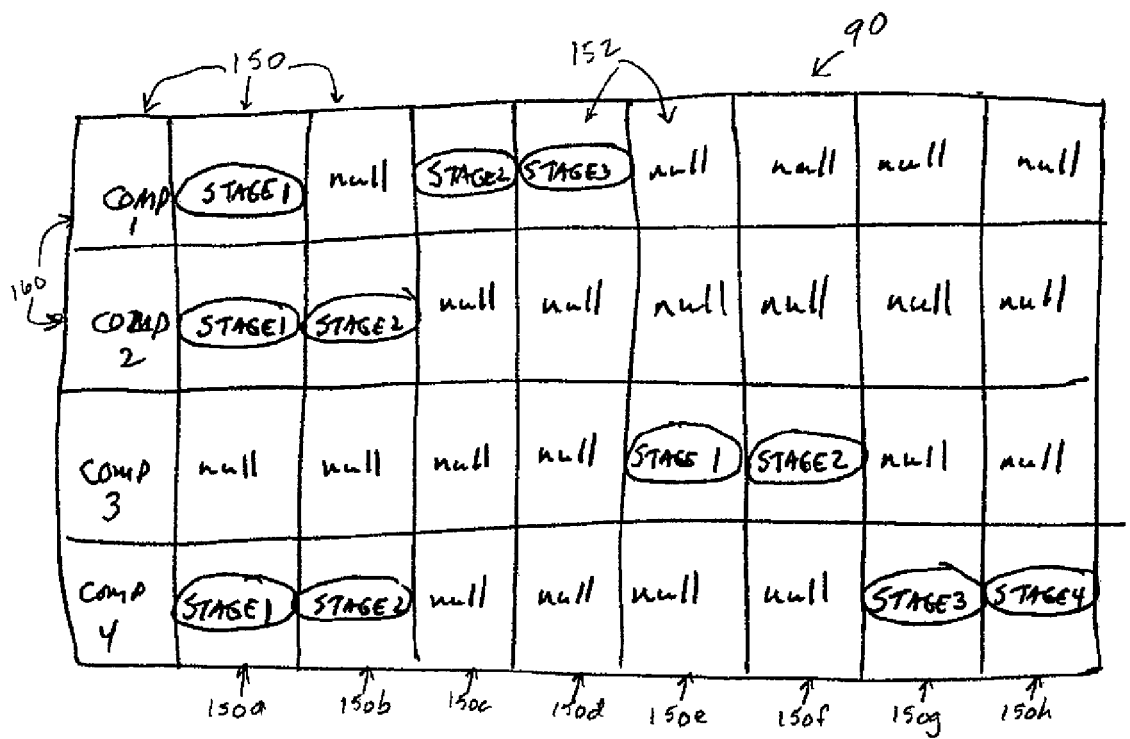
FIG. 6 illustrates a preferred embodiment of a staging table which implements the staged recovery process of FIG. 5.

An exemplary embodiment of the staging table 90 is shown in FIG. 6. As shown, the staging table includes a plurality of columns 150 (150a-150h) and a plurality of rows 160. Each row 160 corresponds to a component and includes that component's stages. Each column 150 generally corresponds to a time slice in which any stage listed in that column can be run. Each cell 152 in the table 90 includes a value. The value may comprise a stage identifier or a value (e.g., a null value). FSS 112 accesses the staging table 90 to schedule the stages of the various components. The number of columns provided in the table and the placement of the null values are such that the inter-stage dependency information is inherently built into the table and preferably computed at compile time.

Referring still to FIG. 6, FSS schedules the various stages of the recovery process by accessing the first column in the staging table (column 150a). FSS finds three stages in column 150a—stages 1 of components 1, 2 and 4. Component 3 shows a null value in column 150a indicating that no stage of component 3 can be scheduled at this time. FSS then requests that stages 1 of components 1, 2 and 4 begin execution. Each stage preferably reports back to FSS upon completion of that stage so that FSS will know that the stage has completed. Once the stages in column 150a have completed, FSS then examines the next column (column 150b) to determine which stage(s) can be scheduled next. As shown in column 150b, stages 2 of components 2 and 4 are listed. Accordingly, FSS requests those stages to be executed. This process repeats itself for the remaining columns 150c-150h until all stages in the table have been executed.

FSS preferably includes an internal component called "SCM0" that has some reserved stages (stages whose name FSS recognizes). These stages are used to block further recovery operation of a service until all services are blocked. When all recovering services have reached the BLOCKING stage, FSS instructs the services to proceed to completion. This arrangement allows the critical stages of recovery to happen faster in the Standby CP, thereby improving the recovery time of the switch.

By listing the stage identifiers in the appropriate cells 152 in the staging table 90, the inter-stage dependency links are implemented. For example, as noted above, stage 1 of component 3 is dependent on component 2, stage 2 and component 1, stage 3. As shown in table 90, stage 1 of component 3 is listed in column 150*e*. Stage 2 of component 2 is shown in column 150*b* and stage 3 of component 1 is shown in column 150*d*, both columns of which precede column 150*e* in which stage 1 of component 3 is listed. Thus, component 3, stage 1 will not be scheduled for execution by FSS until the stages on which it depends have completed. Moreover, column 150*e* is the earliest column in which stage 1 of component 3 could be listed. Although alternatively it could be included in subsequent columns, stage 1 of component 3 preferably is listed in column 150*e* to minimize the amount of time needed to perform the recovery process. A similar analysis applies to all other dependencies enforced in the staging table 90. The staged recovery process described herein permits FSS 112 to efficiently schedule the various component stages of the recovery process.

Unique XIDs for Each CP

According to their normal operation, CPs 72 send requests of various type to switches 52, other CPs, and other entities in the network. The requests may originate from the CP or from another device in the system (e.g., another CP). In the latter case, the CP receives the request and sends it as required. Some of these requests may result in data or other information being returned to the CP that originated the requests. Thus, when an image, that was previously a standby image, becomes active one or more requests may still be working their way through the system in various degrees of completeness. Moreover, the fail-over may have occurred after a request was sent out, but before a response was returned.

In accordance with another aspect of the preferred embodiment, once a standby image becomes active, the now active image re-issues all pending requests originated by the previous active image. For each request that might possibly require a restart, the standby image was preferably sent a "request start" notification message by the (formerly) active CP, using a synchronous update, and the standby CP would have added the request to a list of outstanding requests. For each such request that was completed, the (formerly) active CP, would have sent a second "request complete" message, at which time the standby image would have deleted its outstanding request state. When a standby image becomes active, it simply restarts all outstanding requests for which no completion message has been received. With all previously pending requests re-issued, multiple responses may be received by the newly active CP for the same request. That is, the remote entity that receives the original and re-issued requests will respond accordingly and provide two responses—one resulting from the original request and the other resulting from the re-issued request. Preferably, however, the newly active image uses only the response resulting from the re-issued request; the response associated with the original request is not used and may be ignored or otherwise trashed by the image.

Figure 7:
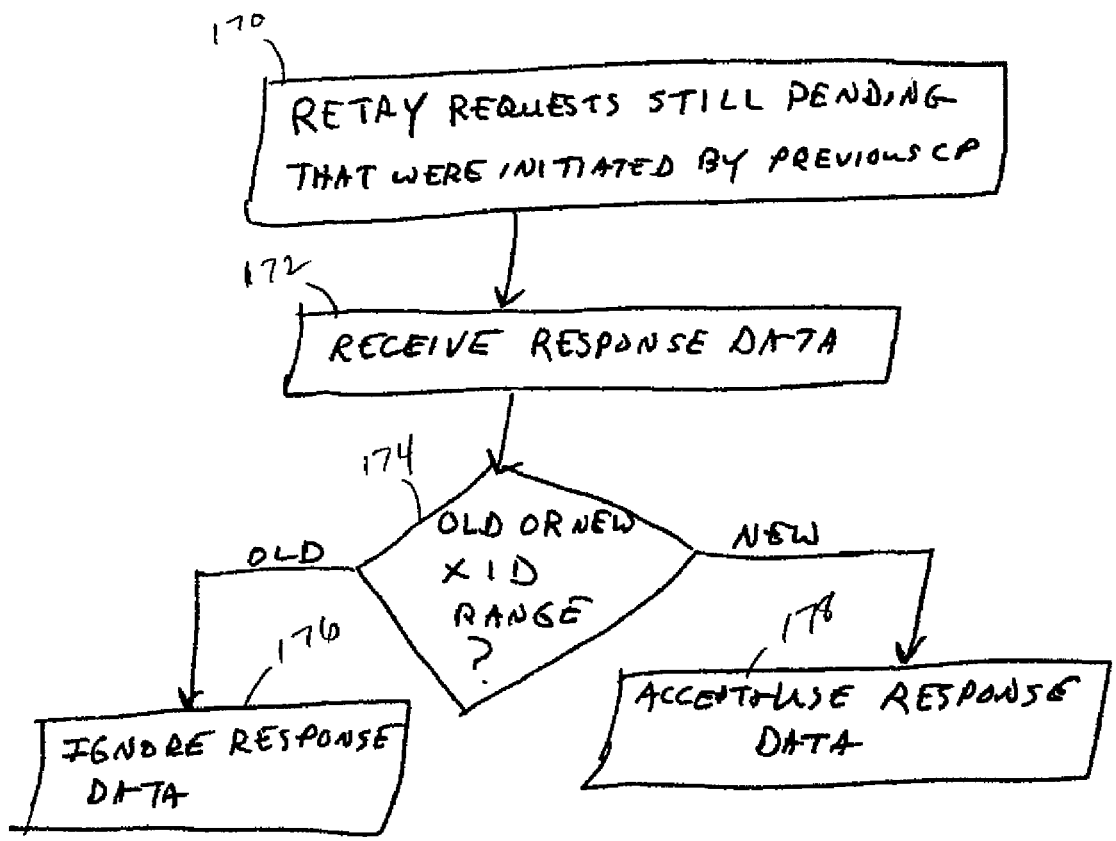
FIG. 7 shows a flow chart depicting how a fail-over image responds to outstanding messages that originated from the previous controlling image using a unique range of exchange identifiers.

FIG. 7 depicts this process. In block 170, the newly active image preferably retries all requests that are still pending when the previous active image failed-over to the standby image. In block 172, the newly active image receives response data associated with one or more of the original or re-issued requests and in decision block 174 determines whether the response data is "old" (i.e., pertains to an original request) or "new" (i.e., pertains to a re-issued request). If the response data is old, the data is ignored in block 176. Otherwise, new data is accepted and used, as is described in block 178.

In accordance with a preferred embodiment of the invention, each CP 72 includes a mechanism to be able to determine whether response data pertains to a request that originated from an image on that CP or on another CP. Referring briefly to FIG. 3, that mechanism includes an exchange identifier ("XID") set 88. XIDs are used in accordance with conventional Fibre Channel usage to uniquely identify a "transaction" between entities in the network. Each transaction refers to a data conversation in which requests and responses are passed back and forth. A CP 72 may have multiple transactions on-going at any one point in time and each transaction is assigned a different XID value to permit the CP to distinguish one transaction from another. The XID range 88 includes at least one XID value, and typically will include a plurality of XID values.

The XID values preferably are unique to each CP meaning that each CP 72 has a unique, non-overlapping range of XID values. The XID values preferably are assigned by the CP's FSS facility 112. Through the CPs' FSS facilities' ability to communicate with one another, the range of XID values used by one CP can be conveyed to the other CP to avoid re-use of the same XID range. Alternatively, on initialization, each CP, via HAMs 122, can coordinate with each other to use a different range of XID value. At any rate, upon a fail-over, the newly active image will use a different range of XID values than was used by the previous active image.

An XID value associated with the CP is included in each request message that the CP sends to another entity in the network, and the same XID value is included in the response message that is returned to the CP. Thus, in block 174 a CP's image can determine whether response data is associated with a request that originated from that CP or from another CP by examining the XID value in the response itself.

This technique permits a CP, which issues requests containing XIDs, to be transitioned from a first state to a second state. The XID(s) used in the first state are different from the XID(s) used in the second state. The CP may receive a response to an issued request and determine whether the response contains an XID pertaining to the first state or the second state. If the XID in the response pertains to the first state, the CP ignores any data contained in the response. If, however, the response contains an XID pertaining to the second state, the CP processes data contained in the response.

Single CP Firmware Change

Although the system may include multiple CPs 72 for redundancy, the system can still operate with only a single CP. A user may desire to change the firmware executing on the CP for a variety of reasons. For example, the current version of firmware may have a defect (i.e., a "bug"). Further, a new and improved version of firmware may be available that implements additional and/or improved functionality. For whatever reason, a user may desire to replace the CP's firmware which is stored in non-volatile memory 92. The following description explains a preferred embodiment for firmware replacement in a way that maintains the single CP available for operation as much as possible (i.e., "high availability").

In a multiple CP system, the new firmware can be brought up as a standby image. Then, using the process described above, the active image's state information can be dumped to the active in a synchronization process. Once synchronized, the standby image (which comprises the new firmware) can force a fail-over to then become the new active image. If desire, the previous active image can repeat the above process to replace itself with the new firmware. The following description explains a preferred embodiment for replacing firmware in a single CP system using much of the functionality described above for replacing firmware in multi-CP system.

Figure 8:
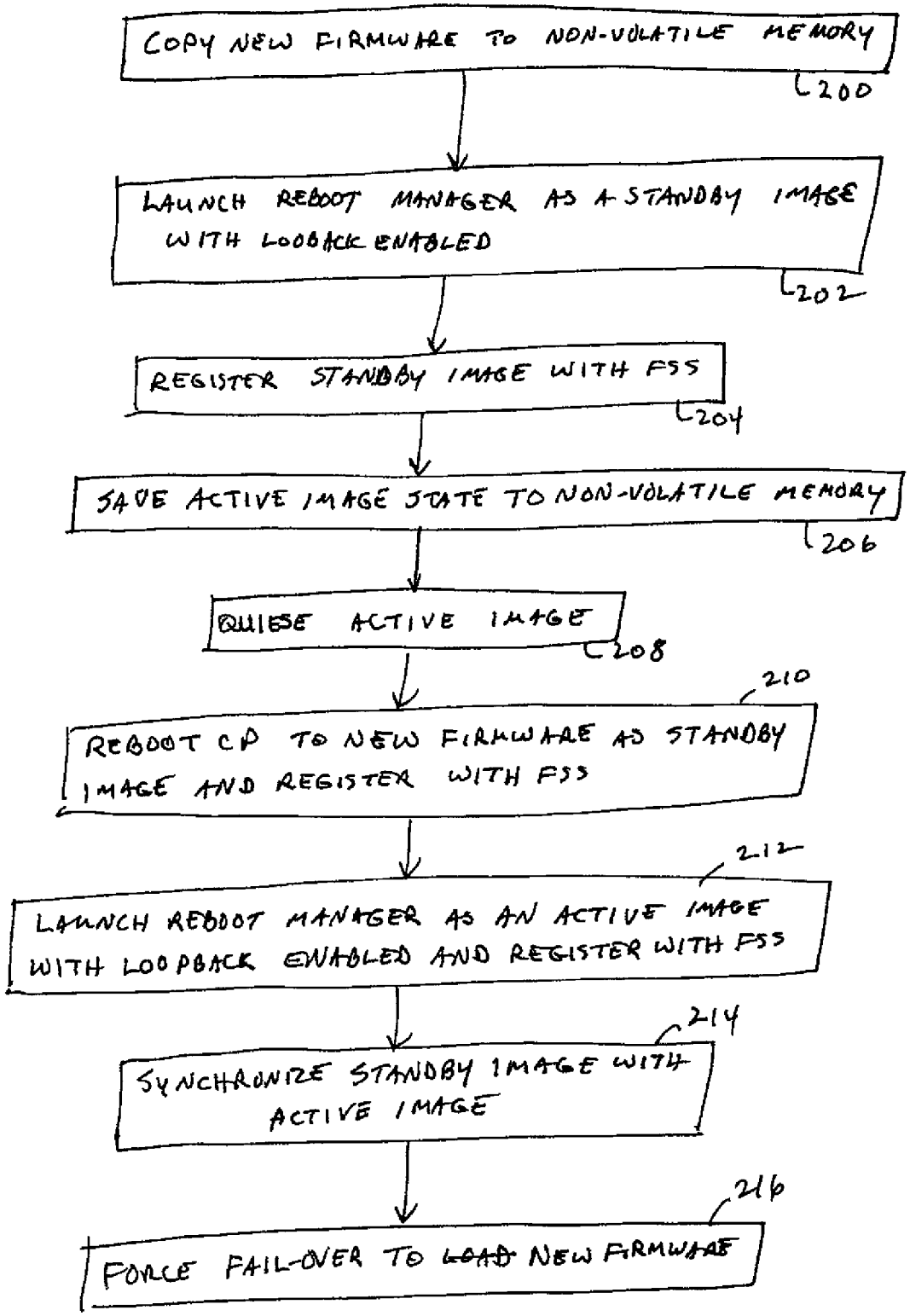
FIG. 8 shows a flow chart showing how firmware can be changed in a single control processor system.

Referring now to FIG. 8, in conjunction with FIG. 3, a method is shown by which firmware can be changed on a CP in a system for which no standby image exists. The method shown utilizes much of the logic explained above and minimizes the amount of down time experienced by the CP during the firmware change over. In block 200, the new firmware (which may comprise one or more of the service components) is stored in non-volatile memory 92 (FIG. 3) which may comprise flash memory, a hard drive or ROM as explained previously. In block 202 a reboot manager utility 99 is launched and is designated as a standby image to the currently active image running on the CP. The reboot manager 99 opens a management channel to FSS 112 and creates a standby image, pointing at the active image. A "loopback" transport is created by which state updates from the active image are looped back internally to the standby image in the same CP.

In block 204, the reboot manager 99 registers itself with FSS 112 as all the components of the standby image. Then, in block 206, the new standby image (an instance of the reboot manager) is synchronized to the current active image as was described above. This process thus uses the same basic logic and code as would be used if the standby image was a true copy of the active image running on another CP. Thus, the standby reboot manager image sends a SYNCH_START message to the active image, thereby causing all components of the active image to begin a synchronization dump. As the state updates begin flowing to the reboot manager 99, the messages are saved in the CP's non-volatile memory (e.g., in a file), rather than being applied to component state as would be done if a true standby image was running.

When all components of the active image have finished the synchronization dump, a HALT message is sent to the active image (block 208) by FSS upon request from the reboot manager to cause the active image to cease all operations. When the halt state has been reached, a reboot operation can be performed. A reboot may be necessary to ensure proper operation of the operating system, as would be understood by one of ordinary skill in the art. As such, in block 210, the CP 72 is rebooted with the newly loaded firmware. Based on information passed to the new system image on reboot, the new firmware service image comes up as a standby image, pointing to an active image. In block 212, the reboot manager is launched again as an active image with loopback enabled and registers itself with FSS as all the components of the instance. Then, in block 214 the standby image (which comprises the newly loaded firmware) synchronizes to the active image during which all previously saved state information is loaded into the components of the standby image. Finally, in block 216, a fail-over is forced from the active image to the standby image. This can occur by issuing a TAKE_CONTROL message to the standby image which causes the standby image to take control of the physical resources, using the saved state as its initial state.

In this manner, new firmware can be loaded onto the CP using as much of the existing mechanisms designed for multiple CP systems as possible. Further, the firmware change can occur with little down time. In some situations, a reboot of the CP may not be necessary as would be understood by one of ordinary skill in the art. In those situations, the reboot block 210 can be skipped.

As explained herein, a CP's software comes up as a standby image. This reduces the complexity of the code.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   (a) saving state information pertaining to first firmware;
   (b) preventing a processor from network communication;
   (c) ceasing execution of the first firmware;
   (d) bringing second firmware to an active state, the first firmware by a reboot manager utility, the processor, and the second firmware forming a single-processor system; and
   (e) applying the saved state information to the second firmware.

2. The method of claim 1 further comprising prior to (d) loading the second firmware into memory accessible by said processor.

3. The method of claim 1 wherein (a) comprises saving the state information to non-volatile memory.

4. The method of claim 1 further comprising following (e) permitting the processor to communicate with the electronic devices using the second firmware.

5. The method of claim 1 wherein (b) comprises only preventing the processor from communicating with network switches.

6. A method, comprising:
   (a) saving state information pertaining to first firmware;
   (b) preventing a processor from network communication;
   (c) ceasing execution of the first firmware;
   (d) bringing second firmware to an active state by a reboot manager utility, the first firmware, the processor, and the second firmware forming a single-processor system; and
   (e) synchronizing the second firmware to the first firmware using the saved state information.

7. A method, comprising:
   (a) loading second firmware onto a system in which first firmware is actively running;
   (b) saving state information pertaining to said first firmware;
   (c) preventing a processor from network communication;
   (d) ceasing execution of the first firmware;
   (e) bringing the second firmware to an active state by a reboot manager utility, the first firmware, the processor, and the second firmware forming a single-processor system; and
   (f) synchronizing the second firmware to the first firmware using the saved state information.

8. A system, comprising:
   a control processor executing firmware, said control processor having memory;
   wherein the firmware can be changed to new firmware by a reboot manager utility, the firmware, the control processor, and the new firmware forming a single-processor system, the change to the new firmware occurring by saving state information pertaining to the firmware in said memory, preventing the processor from network communication, ceasing execution of the firmware, bringing the new firmware to an active state and applying the saved state information to the new firmware.

9. The system of claim 8 wherein the firmware change further comprises loading the new firmware into said memory.

10. The system of claim 8 wherein said memory comprises non-volatile memory.

11. The system of claim 8 wherein the firmware change further comprises the control processor communicating using the new firmware.

12. The system of claim 8 wherein preventing the processor from communicating comprises preventing the processor from network communication with network switches.

13. A control processor, comprising:
a Central Processing Unit (CPU); and
memory coupled to said CPU and containing CPU executable firmware having associated state information;
wherein the firmware can be changed to new firmware by a reboot manager utility, the firmware, the CPU, and the new firmware forming a single-processor system, the change over to the new firmware occurring by saving state information pertaining to the firmware in said memory, preventing the control processor from network communication, ceasing execution of the firmware, bringing the new firmware to an active state, and applying the saved state information to the new firmware.

14. The control processor of claim 13 wherein the firmware change further comprises loading the new firmware said memory.

15. The control processor of claim 13 wherein said memory comprises non-volatile memory.

16. The control processor of claim 13 wherein the firmware change further comprises the control processor communicating with the using the new firmware.

17. The control processor of claim 13 wherein preventing the control processor from network communication comprises preventing the control processor from communicating with network switches.

18. A computer readable storage medium for storing an executable set of software instructions that are executable by a processor, said software instructions comprising:
(a) a means for saving state information pertaining to first firmware;
(b) a means for preventing the processor from network communication;
(c) a means for ceasing execution of the first firmware;
(d) a means for bringing second firmware to an active state, the first firmware, the processor, and the second firmware forming a single-processor system; and
(e) a means for applying the saved state information to the second firmware.

19. The storage medium of claim 18 further including a means for loading the second firmware into memory accessible by said processor prior bringing the second firmware to an active state.

20. The storage medium of claim 18 wherein (a) comprises a means for saving the state information to non-volatile memory.

21. The storage medium of claim 18 further comprising a means for permitting the processor to communicate using the second firmware following applying the saved state information to the second firmware.

22. The storage medium of claim 18 wherein the means for preventing comprises a means for preventing the processor from communicating with network switches.

23. A method, comprising:
(a) launching a reboot manager utility as a standby image;
(b) synchronizing the standby image to an active image in which first firmware is running;
(c) preventing a processor from network communication;
(d) making second firmware a standby image, the first firmware, the processor, and the second firmware forming a single-processor system;
(e) launching the utility as an active image;
(f) synchronizing the standby image to the active image; and
(g) failing over from the active image to the standby image.

24. The method of claim 23 wherein (b) comprises saving state information pertaining to the active image to non-volatile memory.

25. The method of claim 23 wherein (f) further comprises retrieving state information from non-volatile memory and applying the retrieved state information to the standby image.

26. The method of claim 23 wherein (a) further comprises enabling loopback to cause state information update messages destined for another processor system to be rerouted and provided to the standby image.

27. The method of claim 23 wherein (e) further comprises enabling loopback to cause state information update messages destined for another processor system to be rerouted and provided to the standby image.

28. The method of claim 23 further comprising prior to (d) loading the second firmware into memory accessible by said processor.

29. A system, comprising:
a control processor that executes firmware and a reboot manager utility and communicates, said control processor having memory;
wherein the firmware can be changed to new firmware, the firmware, the control processor, and the new firmware forming a single-processor system, the change to new firmware occurring by launching the utility as a standby image, synchronizing the standby image to an active image in which the firmware is running, preventing the control processor from network communication, making the new firmware a standby image, launching the utility as an active image, synchronizing the standby image to the active image, and failing over from the active image to the standby image.

30. The system of claim 29 wherein synchronizing the standby image containing the utility to the active image containing the firmware comprises saving state information pertaining to the active image to non-volatile memory.

31. The system of claim 29 wherein synchronizing the standby image containing the new firmware to the active image containing the utility further comprises retrieving state information from the non-volatile memory and applying the retrieved state information to the standby image.

32. The system of claim 29 wherein launching the utility as a standby image further comprises enabling loopback to cause state information update messages destined for another processor to be rerouted and provided to the standby image.

33. The system of claim 29 wherein launching the utility as an active image further comprises enabling loopback to cause state information update messages destined for another processor to be rerouted and provided to the standby image.

34. The system of claim 29 wherein the firmware change further comprises loading the new firmware into said memory.

35. A control processor, comprising:
a CPU; and
memory coupled to said CPU and containing CPU executable firmware having associated state information and a reboot manager utility;
wherein the firmware can be changed to new firmware, the firmware, the CPU, and the new firmware forming a single-processor system, the change to the new firmware occurring by launching the utility as a standby image, synchronizing the standby image to an active image in which the firmware is running, preventing the control processor from network communication, making the new firmware a standby image, launching the utility as an active image, synchronizing the standby image to the active image, and failing over from the active image to the standby image.

36. The control processor of claim 35 wherein synchronizing the standby image containing the utility to the active image containing the firmware further comprises saving state information pertaining to the active image to non-volatile memory.

37. The control processor of claim 35 wherein synchronizing the standby image containing the new firmware to the active image containing the utility further comprises retrieving state information from the non-volatile memory and applying the retrieved state information to the standby image.

38. The control processor of claim 35 wherein launching the utility as a standby image further comprises enabling loopback to cause state information update messages destined for another processor system to be rerouted and provided to the standby image.

39. The control processor of claim 35 wherein launching the utility as an active image further comprises enabling loopback to cause state information update messages destined for another processor system to be rerouted and provided to the standby image.

* * * * *